United States Patent [19]

Jaeggi

[11] Patent Number: 5,566,437
[45] Date of Patent: Oct. 22, 1996

[54] INSTALLATION FOR THE REPROFILING OF TRACKS CARRIED OUT ON A RAILWAY LINE

[75] Inventor: Jean-Pierre Jaeggi, Geneva, Switzerland

[73] Assignee: Speno International SA, Geneve, Switzerland

[21] Appl. No.: 350,545

[22] Filed: Dec. 7, 1994

[30] Foreign Application Priority Data

Feb. 18, 1994 [CH] Switzerland .............................. 498/94

[51] Int. Cl.$^6$ .............................. B23P 6/00; B24B 23/00; B23C 3/00
[52] U.S. Cl. .......................... 29/33 R; 409/139; 451/347
[58] Field of Search ................... 29/33 R, 33 A, 29/33 Q; 409/139, 140, 138, 175; 104/2, 5, 15; 148/146; 164/97.1; 126/271.2 A; 451/347; 219/97, 53

[56] References Cited

U.S. PATENT DOCUMENTS

| 4,135,332 | 1/1979 | Theurer | 451/347 X |
|---|---|---|---|
| 4,236,453 | 12/1980 | Cöllen | 104/15 |
| 4,596,092 | 6/1986 | Panetti | 451/347 |
| 4,749,419 | 6/1988 | Sommer et al. | 148/146 |
| 4,785,589 | 11/1988 | Bühler | 451/347 X |
| 4,843,765 | 7/1989 | Panetti | 451/347 |
| 4,860,727 | 8/1989 | Eads et al. | 126/271.2 A |
| 4,875,657 | 10/1989 | Moller et al. | 164/92.1 X |
| 4,905,422 | 3/1990 | Panetti | 451/347 |
| 4,920,701 | 5/1990 | Panetti | 451/5 |
| 5,134,808 | 8/1992 | Panetti | 451/347 X |
| 5,181,472 | 1/1993 | Scheuchzer | 104/2 |
| 5,195,436 | 3/1993 | Valditerra | 104/15 |
| 5,299,504 | 4/1994 | Abele | 104/2 |
| 5,469,791 | 11/1995 | Theurer et al. | 104/5 |

FOREIGN PATENT DOCUMENTS

| 234137 | 6/1964 | Australia . |
|---|---|---|
| 0266167 | 5/1988 | European Pat. Off. . |
| 0467833 | 1/1992 | European Pat. Off. . |
| 2659584 | 9/1991 | France . |
| 3222208 | 3/1985 | Germany . |
| 633336 | 11/1982 | Switzerland . |
| 654047 | 1/1986 | Switzerland . |
| 666068 | 6/1988 | Switzerland . |
| 675440 | 9/1990 | Switzerland . |
| 680672 | 10/1992 | Switzerland . |
| 1592881 | 7/1981 | United Kingdom . |
| 2121710 | 1/1984 | United Kingdom . |

Primary Examiner—William R. Briggs
Attorney, Agent, or Firm—Young & Thompson

[57] ABSTRACT

The reprofiling installation includes, arranged below a railway carriage, a milling device consisting of two frames (8, 9) linked together. These frames (8, 9) of differing lengths and guided by the track, carry each one a milling unit (22, 24). The installation further includes track heating means (31) located in front of each milling unit (22, 24), means for cooling the tracks behind each milling unit, as well as units for measuring the deformation of the track.

16 Claims, 11 Drawing Sheets

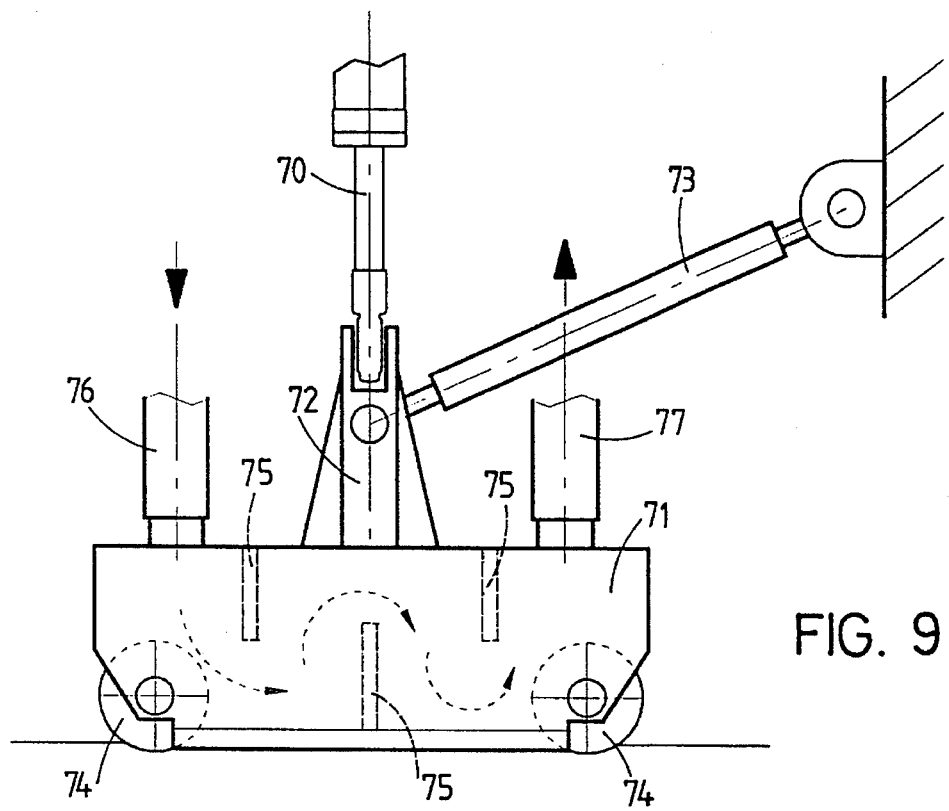
FIG. 9
FIG. 10
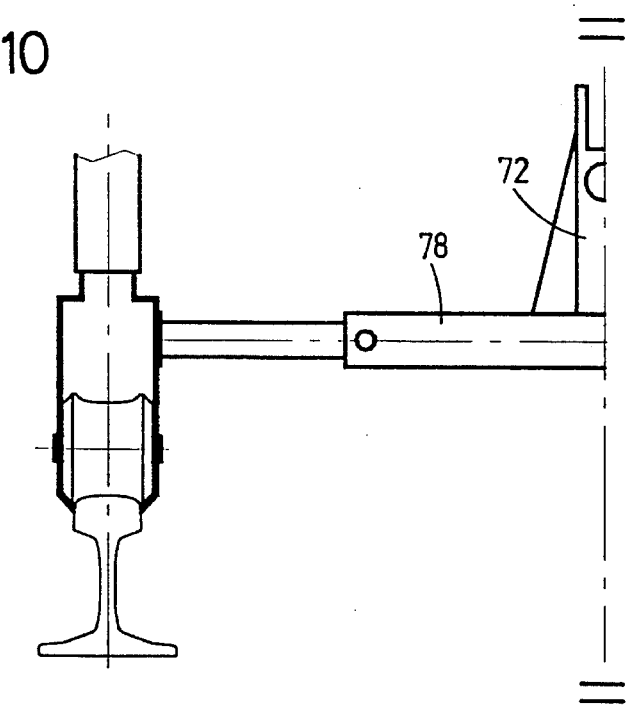

INSTALLATION FOR THE REPROFILING OF TRACKS CARRIED OUT ON A RAILWAY LINE

The present invention is concerned with an installation for the reprofiling of tracks carried out on a railway line. There are numerous devices which make possible the reprofiling of tracks on a railway line, as well as railway vehicles equipped with these devices, in particular those described in the patents CH 633.336; CH 654.047; CH 666.068 or 675.440 which all include grinding units for correcting certain defects of the tracks. Not only do the tracks of railway lines have profiles which are damaged, but they further exhibit longitudinal undulations of variable amplitude. Patent CH 680.672 describes a process which makes it possible to program optimally and in advance the reprofiling operations to be carried out on a given length of track. The use of this process makes its possible to optimize the maintenance operations for the purpose of reducing the time of closure of the railway lines. When in the use of this process, it is found that the amount of material to be removed to correct the defects of the tracks is important, the grinding or polishing of the tacks can require several passages over the same railway section, even when using machines with multiple grinding units. This is rarely compatible with the time which can be allocated to reprofiling operations, owing to the high usage rate of railway lines. Using milling cutters instead of grinders makes it possible to remove more material and hence to work more rapidly. The milling of railway tracks in engineering shops is known and described for example in the French patent 2.659.584. To achieve an accurate reprofiling by milling or grinding carried out on the railway line, one must control that the milling cutter or the grinder is guided longitudinally and transversally. Furthermore, the result is influenced by the guiding base which carries the tool. Actually, the leading end of this guiding base moves on a surface exhibiting defects which are partly reproduced by the tool. Devices for reprofiling tracks by milling carried out on the railway line were proposed in particular in patent AT 234.137 which uses as guiding base a long ruler supporting two milling heads positioned at an angle. The German patent DE 32 22 208 uses two vertically adjustable shoes which form a symmetrical base on both sides of the milling cutter. These devices suffer the drawback that they can only correct one type of track defect at the time. The longitudinal undulations of the tracks do not all have the same peak to peak distance, and one has to remove both long undulations 30 cm to 3 meters) and short undulations (3 cm to 30 cm). The prior art devices have tools carried by a single guiding base and therefore correct only undulations with a certain peak to peak distance (long when the guiding base is long), which is not compatible with the quality required for high-speed networks.

On the other hand, the quality of the finish achieved by milling is clearly insufficient for high-speed trains and accordingly, in order to eliminate totally all the marks left by the teeth of the milling cutter, a polishing of the track must be carried out, which operation with existing devices necessitates a subsequent passage with another machine.

The purpose of the present invention is to obviate the above-mentioned drawbacks. To this end, the applicant proposes a reprofiling installation for at least one track of a railway capable of removing a large amount of metal and thus eliminate both long and short undulations, while ensuring a perfect finish of the reprofiled tracks. Another purpose of the invention is to increase the speed of the track reprofiling operation. Also, the reprofiling installation must be capable of removing and treating all the metallic residues produced by the track reprofiling.

The object of the present invention is an installation for reprofiling the head of at least one track of a railway line, which has the characteristic features set forth in claim 1.

The annexed drawing illustrates schematically and by way of example two embodiments of the reprofiling installation according to the present invention.

FIG. 9 is a side view of a track cooling device.

FIG. 10 is an end view of the track cooling device.

Figure 1:
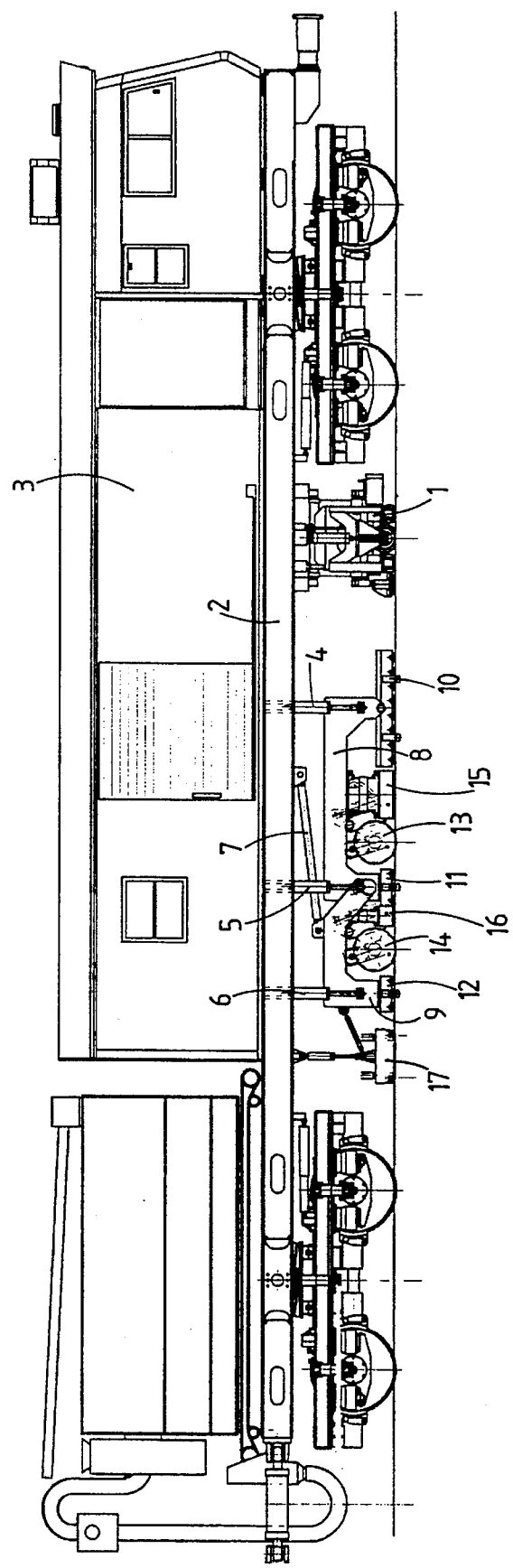
FIG. 1 is a side view of the entire milling carriage carrying a milling device.

The carriage For milling and storing the chips, illustrated in FIG. 1, is the leading element of the installation For reprofiling rails. This carriage includes, in Front of the milling device, a measuring device 1 which allows an evaluation of the track deformations to be corrected. The milling device is fastened to the underframe 2 of the railway carriage 3 by means of the jacks 4, 5, 6 which are designed for holding the milling device in its operative position or for lifting it. A drawbar 7 connects the underframe 2 to the frame 9 of the milling device. This drawbar 7 is designed for pulling the milling device along the railway line. The milling device includes two Frames 8, 9 which are linked together. These frames 8, 9 bear upon each track at three points via support and guiding units 10, 11, 12. The Frames 8 and 9 are of differing lengths, the frame 8 carrying the milling unit 13 being longer than the frame 9 which carries the milling unit 14. These frames 8, 9 provide each one a guiding base for the milling unit 13, 14 they carry. The milling unit 13 carried by the longer frame 8 is designed for removing the long undulations of the track, whereas the milling unit 14 carried by the frame 9 will remove the short undulations.

Each one of the milling units 13, 14 is provided with a milling cutter as well as with means for moving this milling cutter which will be described in detail hereafter. FIG. 1 further illustrates devices for heating the track 15, 16 located in front of each one of the two milling units 13, 14, as well as a device for cooling the tracks 17 located at the rear of the milling device. The track heating devices are mounted respectively on the frames 8 and 9. The cooling unit 17 is pulled by the second frame 9, via a drawbar.

The unit I for measuring the deformations of the track is capable of determining the cutting depth at which it is desired that the milling cutters operate, as well as the power to be supplied to the heating units for a given speed of progression.

Figure 2:
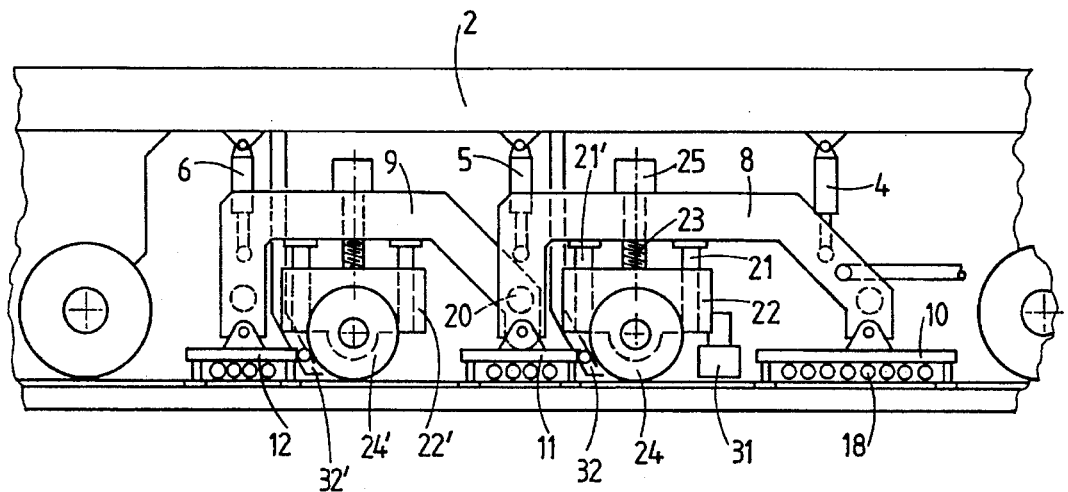
FIG. 2 is a side view of a first embodiment of the milling device.

FIG. 2 illustrates schematically and in more detail an embodiment of the milling device. This device has a first frame 8 connected via two jacks 4, 5 to the underframe 2 of the carriage. These jacks 4, 5 maintain the frame 8 under the underframe 2 and enable it to be lifted by releasing a pedal for example. In operation, these jacks 4, 5 make it possible to apply the milling unit against the track with a determined force.

The frame 8 when viewed sidewise includes a horizontal portion extending approximately between the two jacks 4 and 5. This horizontal portion is prolonged by an oblique riser at the front and a vertical riser at the rear. The oblique riser is connected to a first bearing and guiding device 10. This device 10 is provided with rollers 18 which are in contact with the track in the operative position and with guiding shoes 19. A second bearing and guiding device 11 acts as support for the rear riser of frame 8. The milling device further includes a second frame 9 carrying a second milling unit. The front oblique riser of the second frame 9 is linked to the rear riser of frame 8 by means of an axis 20 perpendicular to the longitudinal axis of the track. The rear riser of the frame 9 rests upon the bearing and guiding device 12, which is also provided with rollers and guiding shoes. The two frames 8, 9 are linked together and bear upon the track at three points.

Two guiding columns 21, 21' integral with the horizontal portion of the frame 8 extend perpendicularly to the same in the direction of the track. A support 22 provided with two bores corresponding to the guiding columns 21, 21' is connected via a screw 23 to the frame 8. This support 22 includes a milling cutter 24 as well as a motor for driving it.

Through the use of the control device 25 of the screw 23, it is possible to vary the distance between the support 22 and the track and, accordingly, adjust the cutting depth by the milling cutter 24. A second milling unit is arranged in the same manner beneath the frame 9.

Figure 3:
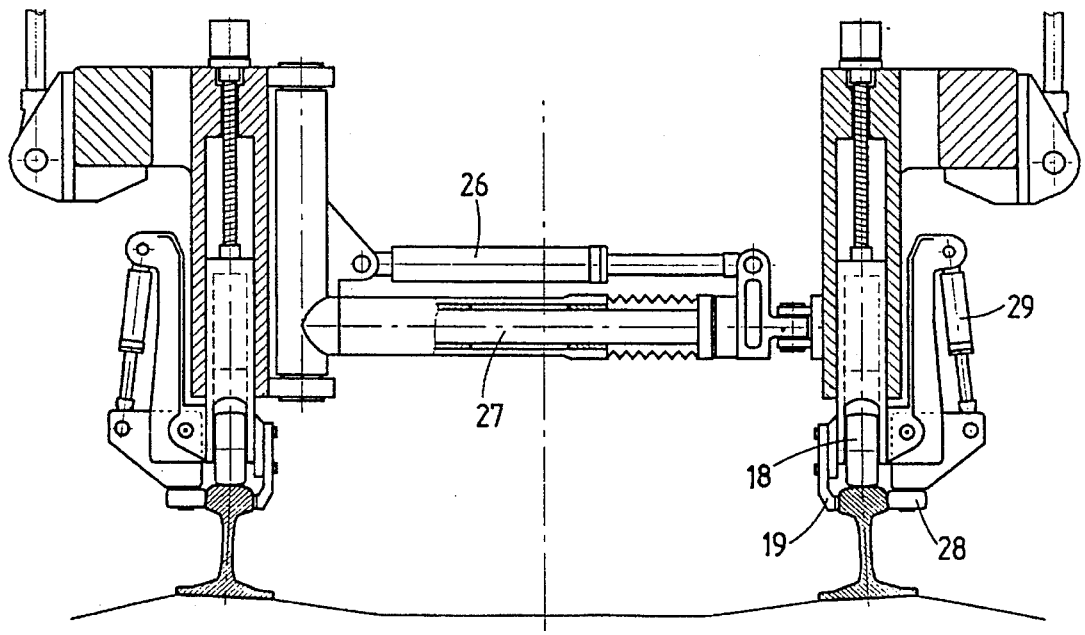
FIG. 3 is a cross-sectional end view of the device illustrated in FIG. 2.

FIG. 3, which is an end view of the milling device, shows the device which makes it possible to adjust the spacing between the frames 8, 9 associated with each track. A hydraulic jack 25 coupled to a guiding device 27 makes it possible to press the guiding shoes 19 against the lateral inner face of each track. These shoes 19 can be replaced by guiding rollers which bear against the lateral inner face of the track. The guiding device is further provided with a guiding roller 28 which is applied by the action of a jack 29 against the outer face of the track, thus ensuring a perfect guiding action in the transverse direction. The bearing and guiding devices 10, 11, 12 include several rollers 18 and shoes 19. The rollers 18 can, in another version, be replaced by bearing shoes. These rollers 18 and their shoes 19 can be mutually spaced apart by a fixed distance or according to a selected pattern. By defining an irregular spacing between the rollers 18, for example corresponding to prime numbers, one avoids that in the presence of regular undulations of the track, all the rollers be located at the peaks or at the bottoms of the valleys of the track undulations. Owing to the presence of the bearing and guiding devices 10, 11, 12 as well as to the presence of the spacing jacks 25, a perfect positioning of the frames 8, 9 is ensured with respect to the track. This transverse guiding of the milling device makes it possible to achieve a considerable precision during milling. The frames 8 and 9 differ in their lengths and act as guiding base for the milling cutters 24, 24'. The guiding base of the first milling cutter, provided for by the frame 8 and the bearing devices 10, 11, is longer than the guiding base 9, 11, 12 of the second milling cutter 24'. Thus, the first milling cutter will be able to correct the longer undulations, while the second milling cutter 24' carried and guided by a shorter base 9 corrects the shorter undulations. The distance between the two milling cutters is selected so as to ensure the best overall efficiency, i. e. the optimum correction of the long undulations of the track and of the short ones. One thus not only achieve a very strong decrease of the amplitude of the defects, but also an excellent surface quality, owing to the fact that the second milling cutter 24' operates at a cutting depth which is substantially constant, since the major defects were eliminated by the first milling cutter 24.

FIG. 2 illustrates, also schematically, a heating unit 31 mounted on the underframe 22. This heating unit 31 makes it possible to bring the outer layer of the track head to a temperature in the order of several hundreds of degrees, which greatly facilitates the operation of the milling cutters 24, 24'. The operating temperature is adapted to the type of steel of which the tracks are made. This heating is generally carried out using a high-frequency induction heating device, but one could also envisage a laser heating device or any other device capable of rising rapidly to a high level the temperature of the outer layer of the track. A second heating unit (not illustrated) can be provided on the support 22' of the second milling cutter 24'. The heating of the track makes it possible on the one hand to increase productivity (speed of progression and rate of material removal) of the milling operation by a factor in the order of 5 and, on the other hand, decrease the wear of the milling cutters by a factor of the same order. Associated with each milling unit, there are provided inlets 32, 32' of a suction device which is designed for recovering the chips produced by the milling cutters. The chip suction and storage device is described with reference to FIG. 13.

Figure 4:
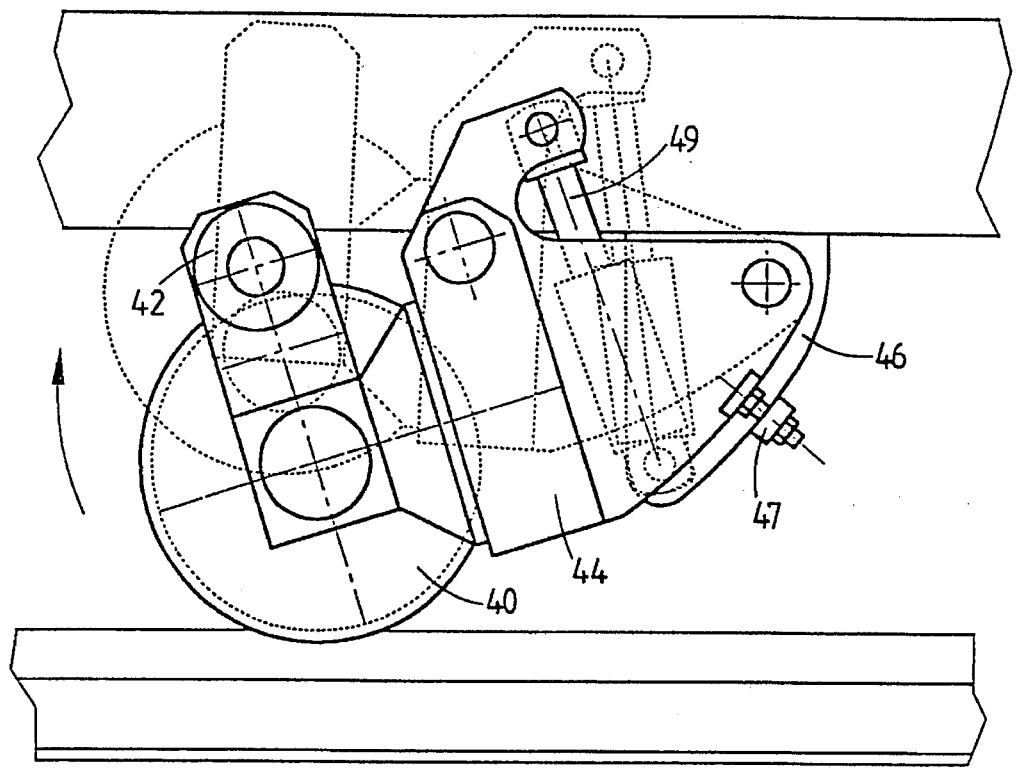
FIG. 4 is a side view of a second embodiment of a milling unit showing the milling cutter in its operational position.
Figure 5:
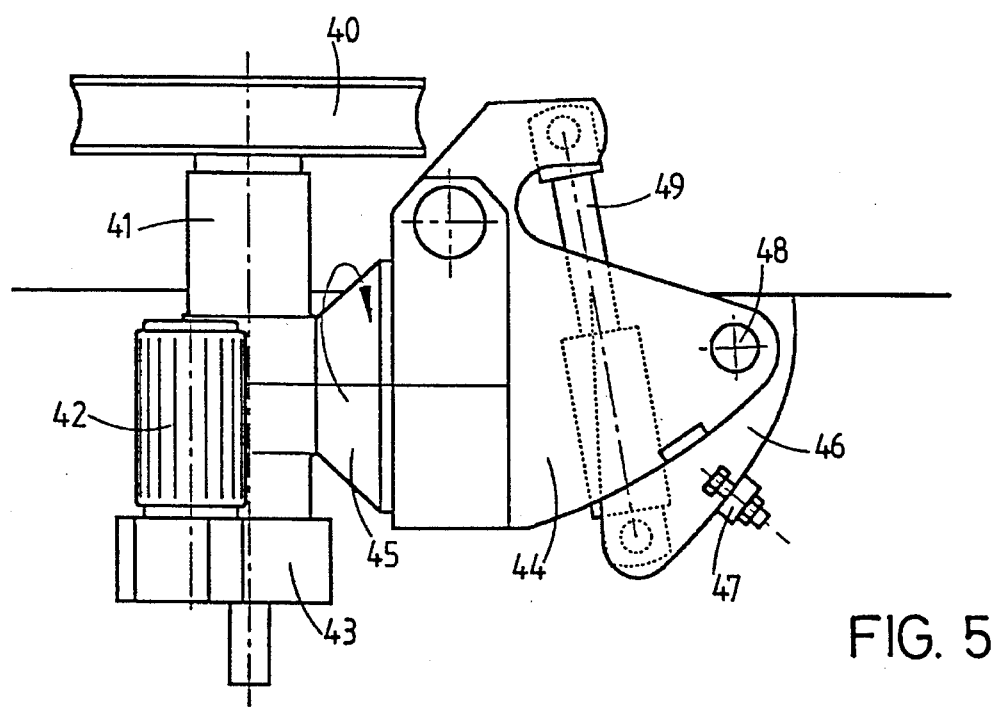
FIG. 5 is a top view of the milling unit illustrated in FIG. 4, in the position when the tool is being changed.

FIGS. 4, 5 illustrate in detail a second embodiment of the milling units, as well as their mode of attachment to the frame which acts as guiding base. The milling unit includes a milling cutter 40 mounted on a mandrel 41. This milling cutter 40 is driven in rotation by a motor 42, coupled with a drive 43, which can be provided with a speed reducer or a clutch. This assembly is mounted on a support 44 via a linkage member 45. This linkage member 45 is pivotally mounted on the support 44 by an axis contained in a vertical plane extending along an axis parallel to the longitudinal axis of the track. Means (not illustrated) arranged in the support 44 make it possible to vary the angular position of the linkage member 45 relative to the support 44 under the action of a control member. Thus, the milling unit can carry out a 90° rotation, which makes it possible to bring successively the milling cutter from an operative position on the track (FIG. 4) into a position for changing the tools as illustrated in FIG. 5. The frame 8 which acts as a guiding base for the milling unit includes a part 46 which is provided with a mechanical stop 47. The support 44 is mounted on part 46 to pivot about an axis 48. By actuating a jack 49, of which the rod is fastened to support 44 and of which the cylinder is fastened to part 46, it is possible to move the milling cutter 40 in the vertical plane, perpendicularly to the tracks. This makes it possible do bring the milling cutter more or less close to the track, depending on the cutting depth required for the reprofiling. The milling unit in its lifted position is indicated by a discontinued line in FIG. 4.

Figure 6:
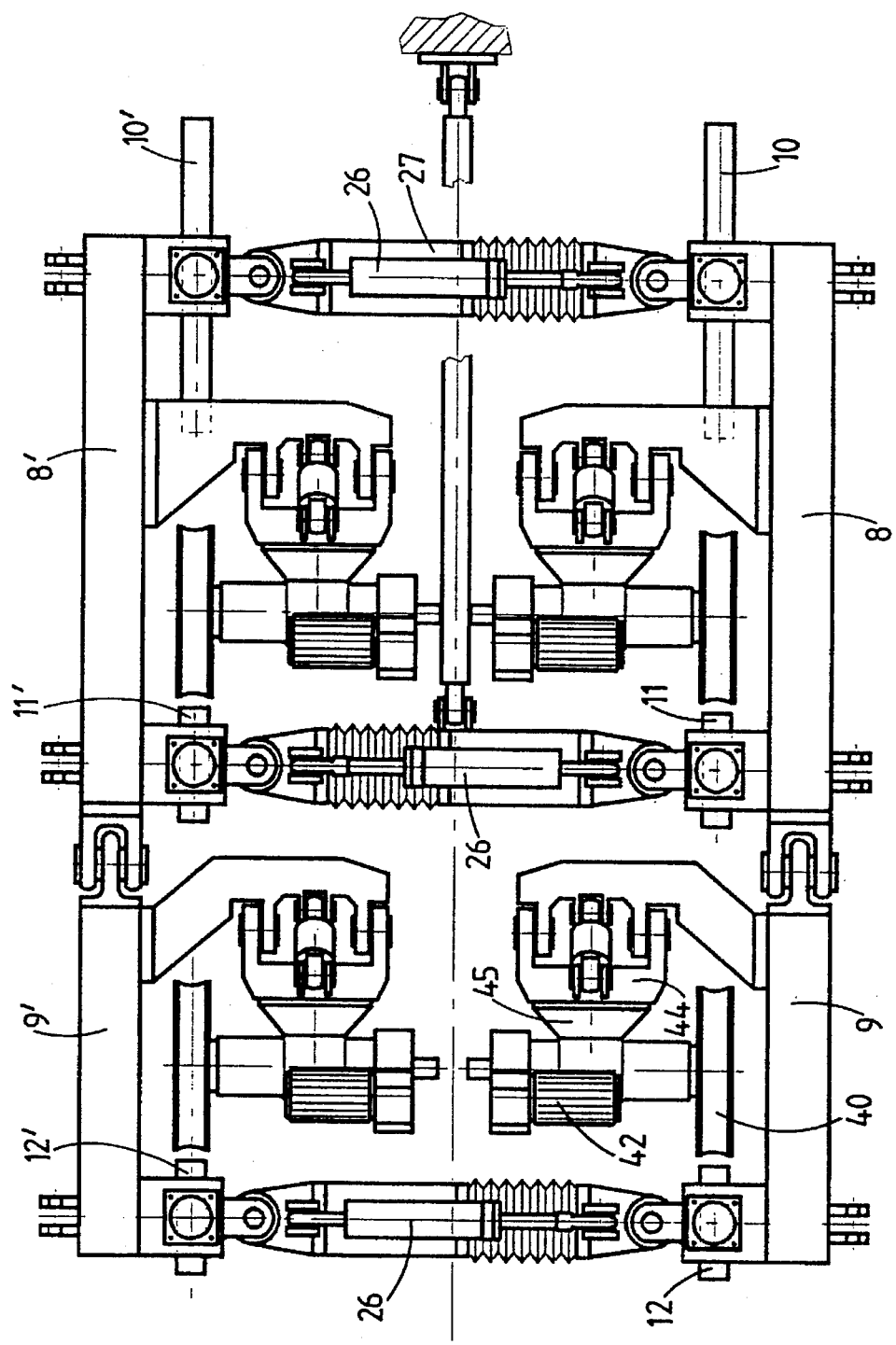
FIG. 6 is a top view of the milling device.

FIG. 6 illustrates the milling device when seen from above, which includes four milling units arranged in their respective frames 8, 9, 8'. 9'. The spacer jacks 26 make it possible to adjust the spacing between the bearing and guiding devices 10, 10', 11, 11', 12, 12' on which rest the frames 8, 9, 8', 9' carrying the milling units.

Figure 7:
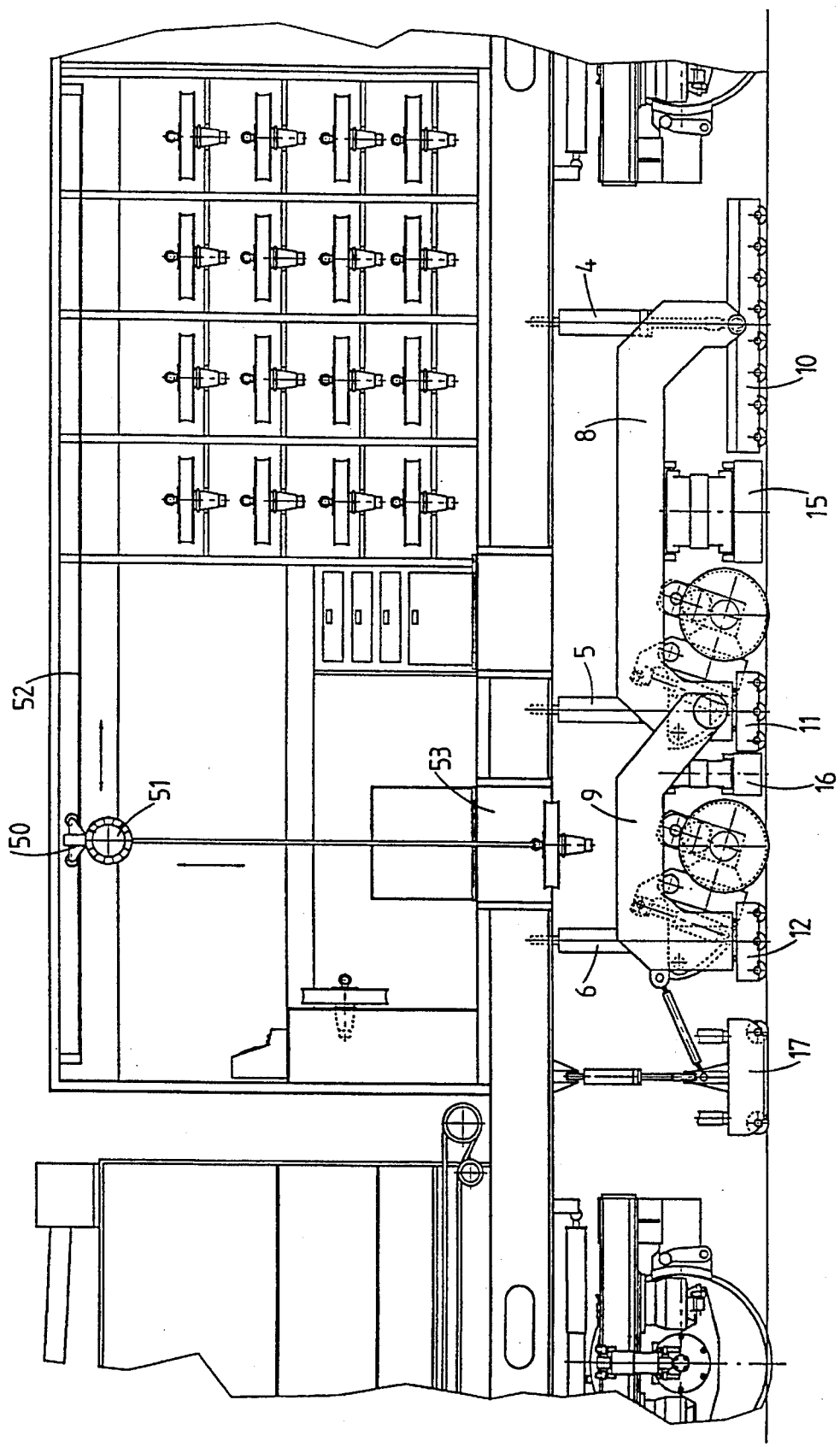
FIG. 7 is a partial cross-sectional side view of the milling carriage illustrating the device for storing and changing tools.

The milling and chip storing carriage illustrated in longitudinal cross-section in FIG. 7 shows the device which makes it possible to change the tool from inside the carriage. A carrier 50 supporting a hoist 51 can moved longitudinally along a rail 52 fastened to the roof of the carriage and lift a milling cutter from the front section of the carriage which contains a reserve of milling cutters. The milling cutter is brought by the hoist 51 through an opening 53 made in the floor of the carriage, above the milling unit, of which the tool is to be replaced.

Figure 8:
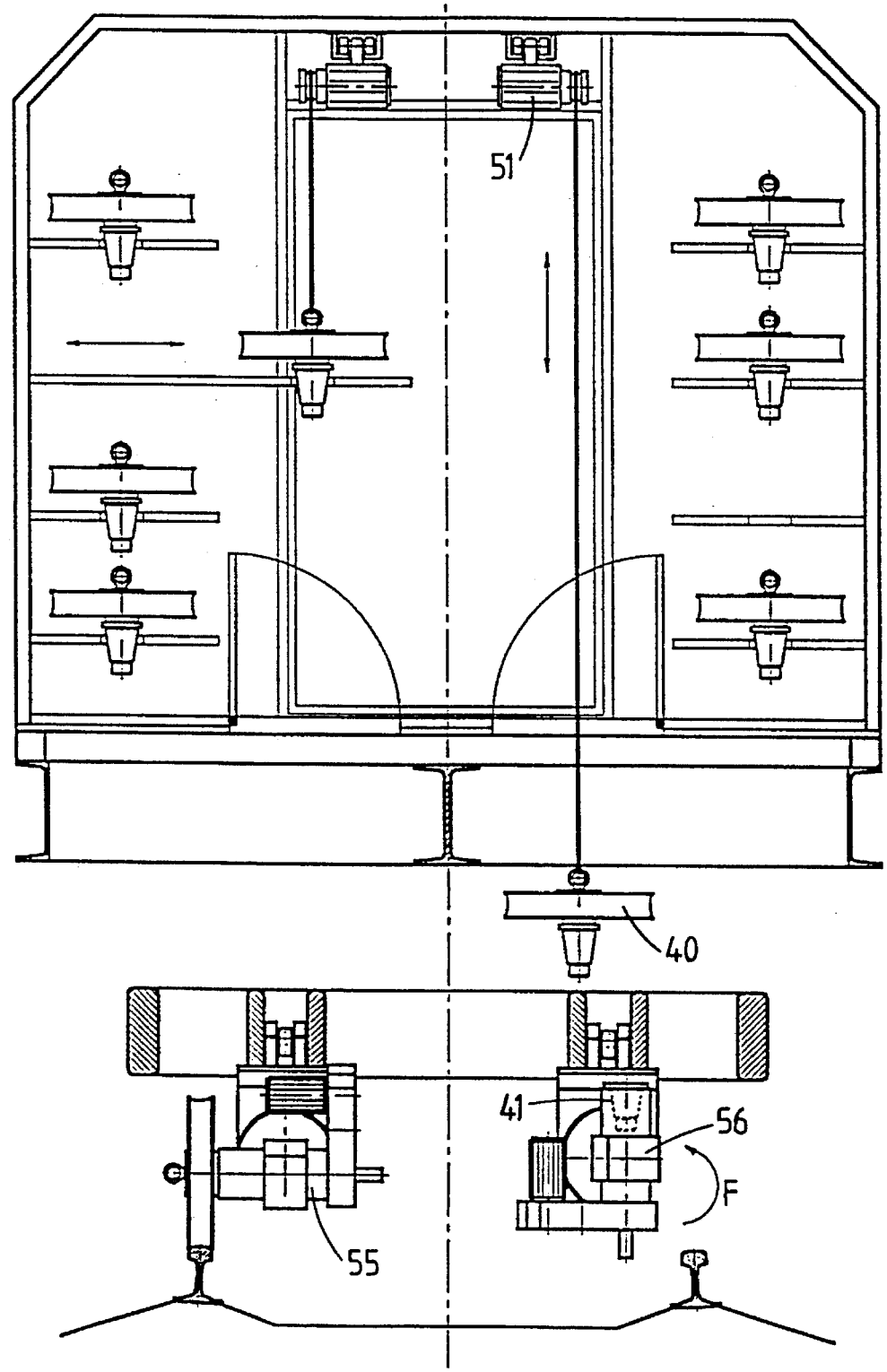
FIG. 8 is a cross-sectional view taken transversally of the milling carriage, illustrating the changing of the tool.

FIG. 8 is another illustration of the replacement of the milling cutters. The milling unit 55 located on the left-hand side of the figure is in its operational position in which the track is being milled, whereas the milling unit 56 is illustrated in a position in which the tool can be changed, after having undergone a 90° rotation around an axis parallel to the track in the direction of the arrow F. In this position, the hoist 51 can align the milling cutter 40 with the mandrel 41 of the milling unit. The fastening by the Morse cone of the milling cutter allows a rapid and easy exchange of the milling cutter.

FIG. 9 illustrates the cooling device 17 located at the rear of the milling unit. This device is connected to the underframe 2 of railway carriage by a jack 70 which makes it possible to lift said device. The piston of this jack 70 is connected to the frame 71 of the cooler via a linkage member 72. This linkage member 72 also receives one of the ends of a drawbar 73, of which the other end is integral with the frame 9 forming the guiding base of the second milling unit. This drawbar 73 makes it possible to pull and to guide the cooler. The frame 71 of the cooler includes guiding rollers 74 which bear upon the track in the operative position. Inside the frame 71, baffles 75 are arranged so as to cause a turbulent flow of the cooling fluid which circulates inside the frame. Furthermore, the frame 71 has on the upper part an inlet 76 and an outlet 77 for the cooling fluid. FIG. 10 illustrates the cooler in a partial cross-sectional view and it shows a jack 78 which is connected to the linkage member 72 and which makes it possible to adjust the spacing between the coolers associated with each one of the rails and thus ensure the transverse guiding of the coolers on the track.

Figure 11:
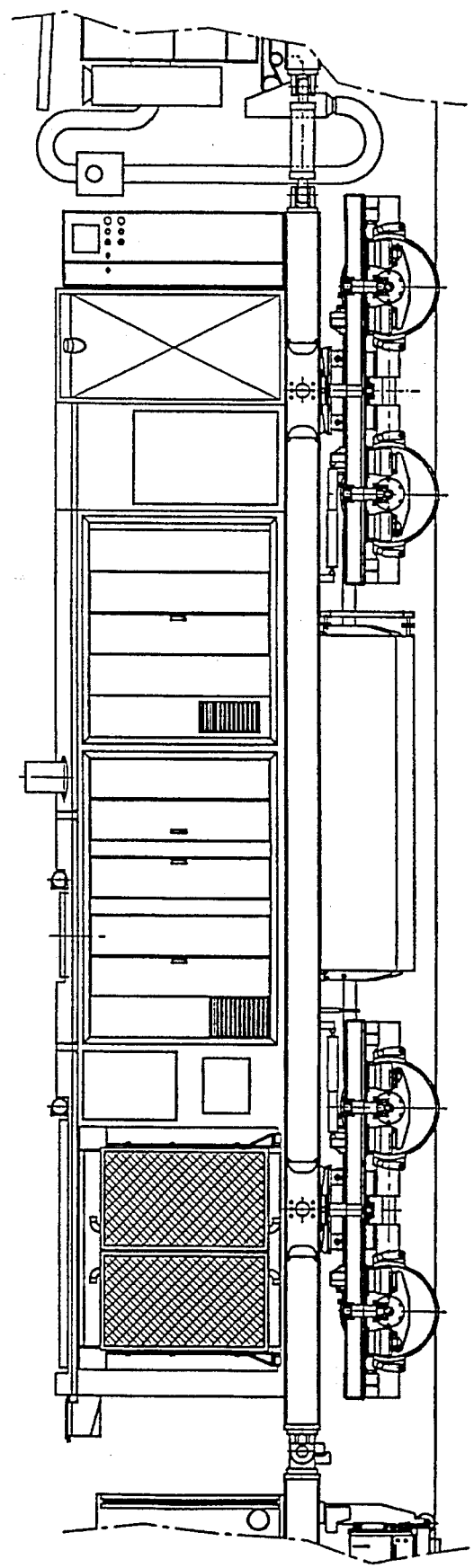
FIG. 11 is a view of the power supplying carriage.
Figure 12:
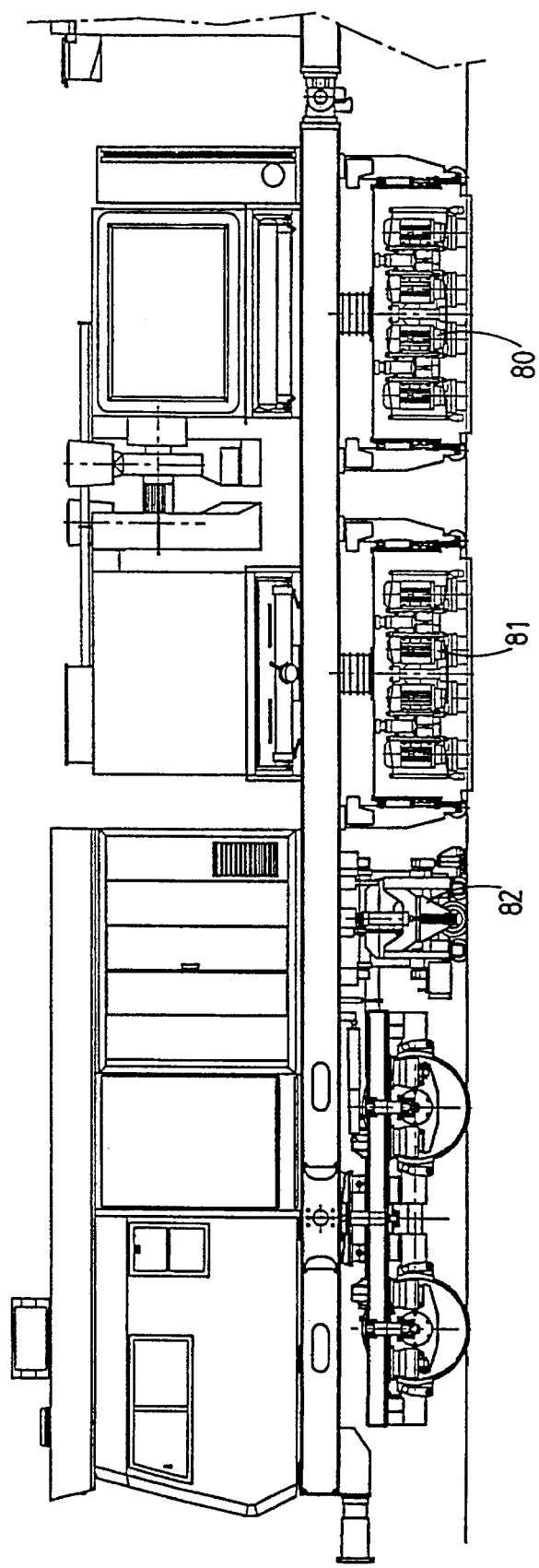
FIG. 12 is a side view of the grinder carriage.

FIG. 11 illustrates the power-supplying carriage used in the track reprofiling installation. This power-supplying carriage provides the electrical power needed for supplying the milling units, as well as for supplying the heating units. This power supplying carriage is located behind the milling carriage which is at the leading end and ahead the carriage illustrated in FIG. 12 which carries the grinding and finishing units 80, 81 used for eliminating the grooves left on the track after the operation of the milling cutters. These grinding and finishing units are for example of the type described in the U.S. Pat. Nos. 4,615,150 or 5,265,379. The grinding devices used can be stone grinders, peripheral grinders, form grinders or form abrasive blocs with a reciprocating motion. This carriage is further equipped with a suction and storage device 82 for the dust produced by the grinding. The grinding carriage also includes a measuring unit 82 located behind the grinding units. This unit 82 makes it possible to assess the quality of the reprofiling achieved and through the use of an automatic control of the grinding and heating units, to correct when needed the cutting depth of the milling units and/or of the heating power supplied to the heating units.

Figure 13:
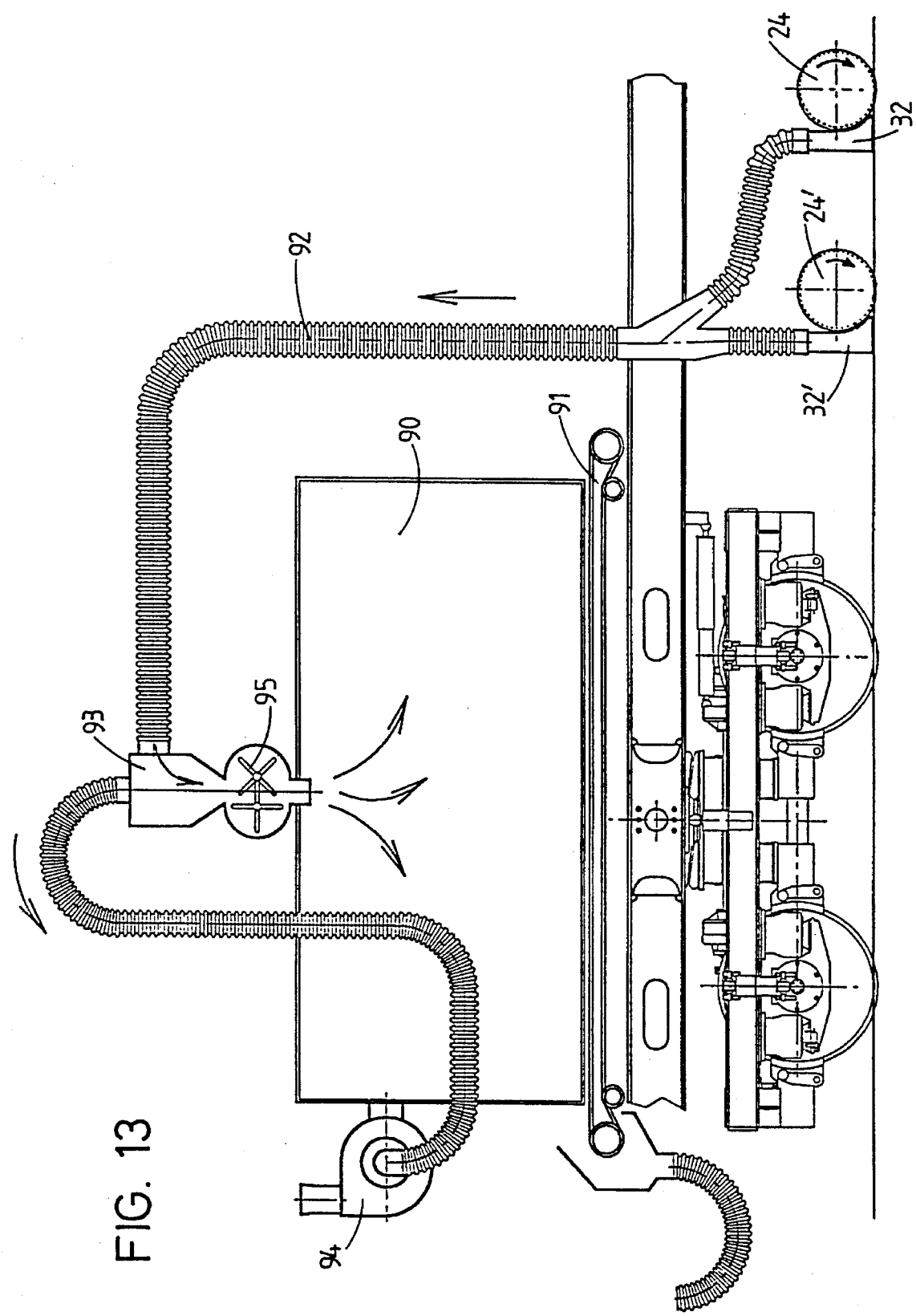
FIG. 13 is a detailed view of the device for sucking up and storing the chips produced during the milling operation

FIG. 13 illustrates in detail the device used for the suction and the storage of the chips during the milling operation. The back part of the milling carriage has a container 90 for the chips. A belt conveyor 91 is provided at the bottom of the container 90. Behind each of the milling cutters 24, 24', there is provided a suction opening 32, 32' connected to a suction duct 92 which opens into a separator device 93. A fan 94 mounted on the carriage causes the suction of the chips which fall into the device 93. This device 93 is provided with paddles 95 driven in rotation which prevent the accumulation of the chips inside the device and facilitates their evacuation towards the container 90 and their spreading inside the same.

Figure 14:
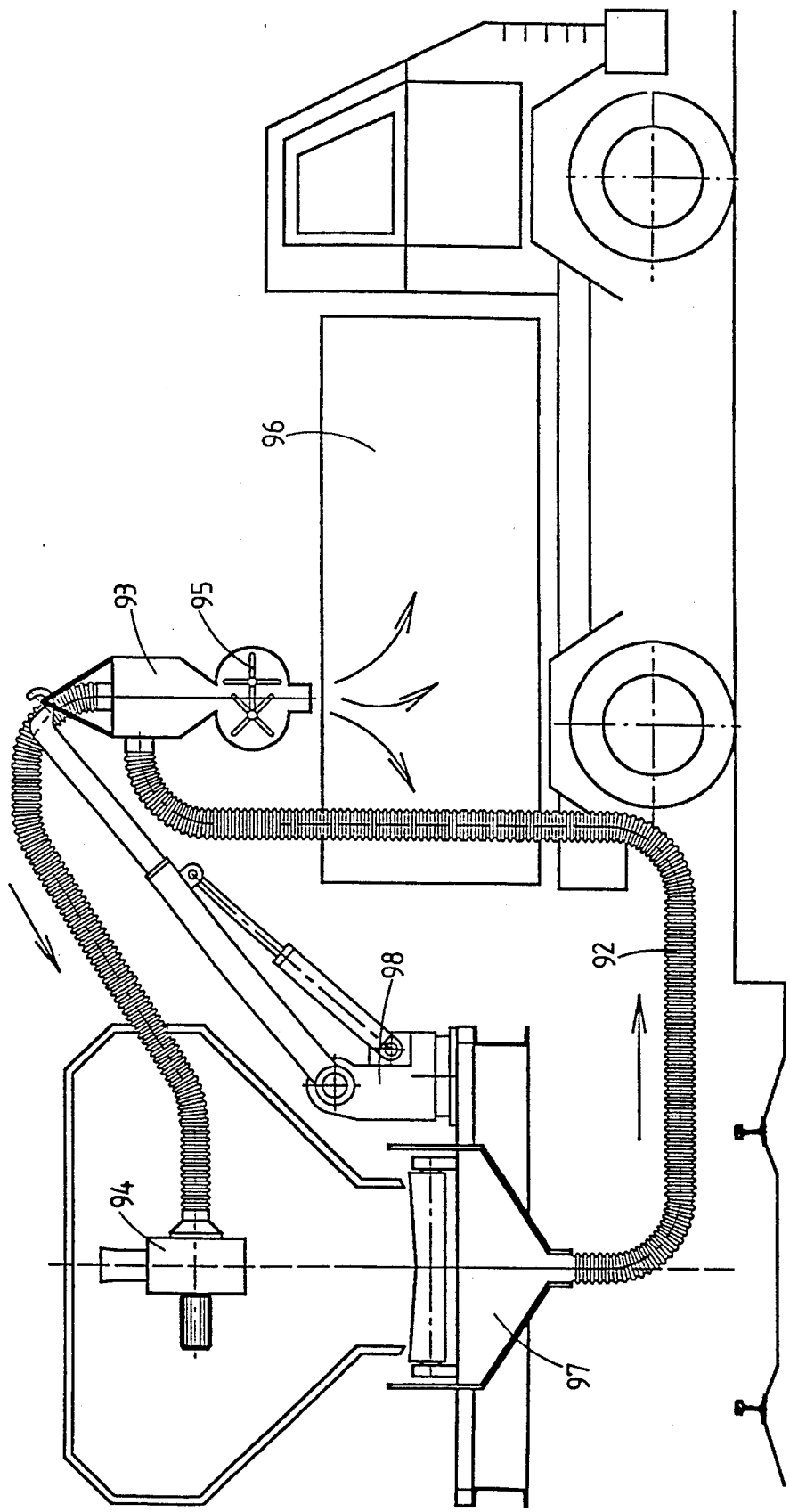
FIG. 14 shows the device for discharging the chips.

FIG. 14 illustrates the discharge operation of the chips. The reprofiling installation being stopped, a tipping lorry 96 can be parked in the vicinity of the installation. The duct 92 is disconnected from the adapter connected to the suction inlets 32, 32' and connected to the outlet of a discharge container 97 positioned beneath the container 90 and into which arrives the belt conveyor 91. The operation of the conveyor belt 91 causes the evacuation of the chips into the discharge container 97.

A hydraulic revolving crane 98 mounted on the milling carriage makes it possible to move the separator device 93 above the tipping lorry 96. The fan 94 then causes the suction of the chips falling into the discharge container 97, into the separator device 93 which evacuates them onto the lorry. In another version (not illustrated) the suction of the chips can be replaced by a device such as a magnetic drum capable of recovering the chips through magnetic attraction.

The reprofiling installation such as that described includes a milling carriage at the front, a power supplying carriage in the middle and a grinding and polishing carriage for the rails. Clearly, these operations can be dissociated if, for example, their speeds are different. Also, one can combine the different units (milling, heating, measuring and grinding) beneath a single carriage.

I claim:

1. An installation for reprofiling at least one track on a railway line, including a milling device mounted under a railway carriage and movable relatively thereto, through the use of means for lifting and applying against the track, characterized in that it includes at least one unit for heating the track located in front of the milling device, both the heater and the milling device operating during movement of the railway carriage along said at least one track, the heating device operating to heat the outer layers of the head of the track to a temperature below the melting point of the track.

2. An installation according to claim 1, characterized in that the unit for heating the track consists of a high frequency induction device.

3. An installation according to claim 1, characterized in that the heating unit consists of a laser beam heating device.

4. An installation according to claim 3, characterized in that the milling unit is mounted pivotally on its support about an axis located in a vertical plane extending along an axis parallel to a longitudinal axis of the track.

5. An installation according to claim 1, characterized in that the heating unit is connected to the underframe of the carriage by lifting means.

6. An installation according to claim 1, characterized in that the milling device has at least two milling units including each one at least one milling cutter driven in rotation by a motor; in that each milling unit is carried by a support movable vertically with respect to a frame guided along the track; in that the two frames are of differing lengths and linked together along an axis perpendicular to the longitudinal axis of the track; in that these frames are connected to the underframe of the carriage by means for lifting and application against the track.

7. An installation according to claim 6, characterized in that the milling units are carried by a support mounted slidably and vertically on the frame and in that means are provided for controlling the position of this support with respect to the frame and therefore with respect to the track.

8. An installation according to claim 1, characterized in that the milling units are carried by a support pivoting on the frame about an axis perpendicular to the longitudinal axis of the track and in that this support is connected to a jack controlling the angular position of the support with respect to the frame.

9. An installation according to claim 1, characterized in that the frames rest upon the track through bearing and guiding devices provided with bearing rollers or shoes in contact with the running surface of the track and guiding shoes of rollers which bear upon the inner lateral face of the track.

10. An installation according to claim 1, characterized in that the frames carrying the milling units associated with each one of the rails are connected by means of jacks which make it possible to adjust the spacing of these frames.

11. An installation according to one of claim 1, characterized in that the heating units are mounted beneath the frames of the milling device.

12. An installation according to claim 1, characterized in that the heating units are mounted on the support of the milling units.

13. An installation according to claim 1, characterized in that the unit for heating the track heats said outer layers of the head of the track to a temperature of the order of several hundreds of degrees.

14. An installation for reprofiling at least one track on a railway line, including a milling device mounted under a railway carriage and movable relatively thereto, through the use of means for lifting and applying against the track, characterized in that it includes at least one unit for heating the track located in front of the milling device, and in that it includes a track cooling unit guided along the track, located behind the milling device and connected to the underframe of the railway carriage by lifting means.

15. An installation according to claim 14, characterized in that the cooling unit includes a frame provided with an inlet orifice and an outlet orifice enabling the circulation of a cooling fluid; in that baffles are arranged inside the frame so as to cause a turbulent flow of the cooling fluid.

16. An installation according to claim 15, characterized in that the unit for heating the track heats said outer layers of the head of the track to a temperature of the order of several hundreds of degrees.

* * * * *